(12) United States Patent
Takanashi

(10) Patent No.: US 7,336,469 B2
(45) Date of Patent: Feb. 26, 2008

(54) INSERT-MOLDED PRODUCT

(75) Inventor: Hitoshi Takanashi, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 14 days.

(21) Appl. No.: 11/493,284

(22) Filed: Jul. 26, 2006

(65) Prior Publication Data

US 2007/0026744 A1    Feb. 1, 2007

(30) Foreign Application Priority Data

Aug. 1, 2005   (JP)   ............................. 2005-222600

(51) Int. Cl.
*H01H 49/00*   (2006.01)
*H05K 7/00*   (2006.01)

(52) U.S. Cl. ...................... 361/142; 361/160; 361/600; 361/679

(58) Field of Classification Search ................ 361/142, 361/160, 600, 679
See application file for complete search history.

(56) References Cited

U.S. PATENT DOCUMENTS

2005/0218558 A1   10/2005   Asao

FOREIGN PATENT DOCUMENTS

JP         2004-40945         5/2004

*Primary Examiner*—Evan Pert
(74) *Attorney, Agent, or Firm*—Gerald E. Hespos; Anthony J. Casella

(57) ABSTRACT

A ground wire connection nut (14A) and a cover-fixing nut (14B) are molded in a case (12) at positions shifted in an axial direction thereof. Caps (17) are mounted on each nut (14A, 14B). First and second receiving surfaces (33A, 33B) are formed on each cap (17) at positions shifted in the axial direction. First and second positioning portions (30A, 30B) are formed in a die (36) and contact the first and second receiving surfaces (33A, 33B) respectively. An axial length of each positioning portion (30) is set according to the specified position of each nut (14A, 14B). The same kind of the caps (17) can be used commonly for the nuts (14A, 14B) to reduce the manufacturing cost.

16 Claims, 6 Drawing Sheets

INSERT-MOLDED PRODUCT

BACKGROUND OF THE INVENTION

1. Field of the Invention

The invention relates to an insert-molded product.

2. Description of the Related Art

An electronic control unit for a vehicle has a synthetic resin case with an open upper end. A printed-circuit board is disposed in the case. Electronic circuits and various electronic parts are provided on the circuit board. The electronic control unit further has a cover to close the upper end of the case. Metal nuts are embedded in the case by insert molding and receive screws to fix the cover to the case. The bottom of each nut is held in position during the insert molding by a hold-down pin that projects from the die. However, a hole is formed below the bottom of the nut as the hold-down pin is withdrawn and the bottom of the nut is exposed to the outside of the case. Thus there is a fear that the sealing performance of the case deteriorates.

Japanese Patent Application Laid-Open No. 2004-40945 discloses an electronic control unit for a vehicle that attempts to address the above-described problem. More particularly, a synthetic resin cap is fit on the bottom of the nut. A projection is formed on the outer side surface of the cap and projects in the axial direction of the nut. An edge of the projection and an inner peripheral surface of the die contact each other. Thus, the nut is positioned in the die and the bottom of the nut is not exposed.

Japanese Patent Application Laid-Open No. 2004-40945 proposes insert molding a case partly around a ground wire connection nut, a metal collar and a relay busbar that connects the ground wire connection nut with the metal collar. The case is molded so that the metal collar is in a mounting hole that opens to the outside of a case. Thus, the metal collar and the case can be mounted on a vehicle body. A screw can be threaded into the ground wire connection nut and can connect a ground wire from the electronic circuit in the case to the ground wire connection nut. Another screw or bolt can be passed through the metal collar for mounting the metal collar and the case to the vehicle and for grounding the electric circuit in the case to the vehicle.

The end of the above-described busbar conceivably could be layered on the peripheral edge of the opening of the ground wire connection nut. However, the axial positions of the ground wire connection nut and the other nut then would differ from each other by the thickness of the busbar. However, the caps would require projections of different dimensions corresponding to the depth positions of the nuts. Consequently the cost for manufacturing the insert-molded product is high.

The invention has been completed in view of the above-described situation, and an object of the invention to provide an insert-molded product that can be manufactured at a low cost.

SUMMARY OF THE INVENTION

The invention relates to an insert-molded product that has metal inserts embedded in a resin molded member. Specifications are set for axial depth positions of the embedded inserts. Insert molding is carried out with a synthetic resin cap fit axially on each insert in the axial direction thereof and with the caps positioned inside a die. The same kinds of caps are fit on the respective inserts. Plural receiving surfaces are formed on each cap by shifting the receiving surfaces in the axial direction according to the specified depth positions of the inserts. Plural positioning portions are formed on the die to contact the respective receiving surfaces for holding the caps in position in the die. The lengths of the positioning portions in the axial direction are set according to the specifications of the depth positions of the inserts.

Several inserts are set in the die and the caps of the same kind are fit respectively on the inserts. The receiving surfaces of the caps contact the positioning portions of the die to hold the inserts in position in the die according to the specified depth positions thereof. The same kind of the caps can be used commonly for the inserts that have different specified depth positions. Thus, manufacturing costs can be reduced.

The receiving surfaces that contact the respective positioning portions form an exposed region that is exposed on an outer surface of the resin molded member. Each of the caps has a fusing portion that projects out in a region inward from the exposed region. The fusing portion surrounds the exposed region entirely circumferentially and a surface of the fusing portion melts during the insert molding and is integrated with the resin molded member. Thus, liquid cannot penetrate inward from the fusing portion.

In a preferred embodiment, the inserts are metal nuts, and the insert-molded product is a case of an electronic control unit. The case is a box that accommodates an electronic control circuit. Additionally, the case is configured to be mounted on a vehicle body. The nuts include a cover-fixing nut for screwing a cover to the case and a ground wire connection nut for receiving a screw to connect a ground wire drawn out of the electronic control circuit. A relay busbar is connected with the ground wire connection nut. The relay busbar is insert-molded, and a first end of the relay busbar is layered on and contacts to a peripheral edge around an opening of the ground wire connection nut. Thus, a depth position of the ground wire connection nut in an axial direction thereof and a depth position of the cover-fixing nut in an axial direction thereof are different from each other by a thickness of the relay busbar. A collar is insert-molded in the case and connects to a second end of the relay busbar. The case is molded so that the collar is in a mounting hole that opens to the outside of the case for mounting the case on a vehicle body.

An end of the ground wire is layered on the first end of the relay busbar, and a screw is threaded into the ground wire connection nut. Thus, the end of the ground wire and the first end of the relay busbar are sandwiched between the head of the screw and the peripheral edge of the opening of the ground wire connection nut. The case then is screwed to the vehicle body. As a result, the second end of the relay busbar and the collar connect the ground wire to the vehicle body to ground the electronic control circuit. As described above, the ground wire and the relay bus bar are sandwiched between the head of the screw and the peripheral edge of the opening of the ground wire connection nut. Thus, the ground wire and the relay bus bar are connected reliably with each other to assure a reliable ground path.

General-purpose nuts can be used to form the ground path, and the relay busbar can be a metal plate. In addition, the nuts and the collar are connected to the relay busbar by insert molding. Therefore, it is unnecessary to prepare a special connection portion or a special connection process, and the insert-molded product can be manufactured at a low cost.

DETAILED DESCRIPTION OF THE PREFERRED EMBODIMENTS

An electronic control unit according to the invention is intended for use in a vehicle and is illustrated in FIGS. 1 through 6. The electronic control unit includes a printed-circuit board 10 on which an electronic control circuit is formed. The printed circuit board 10 is disposed in a casing 11 made of synthetic resin. The casing 11 includes a case 12 with an open top and a cover 13 for closing the open top of the case 12.

Figure 1:
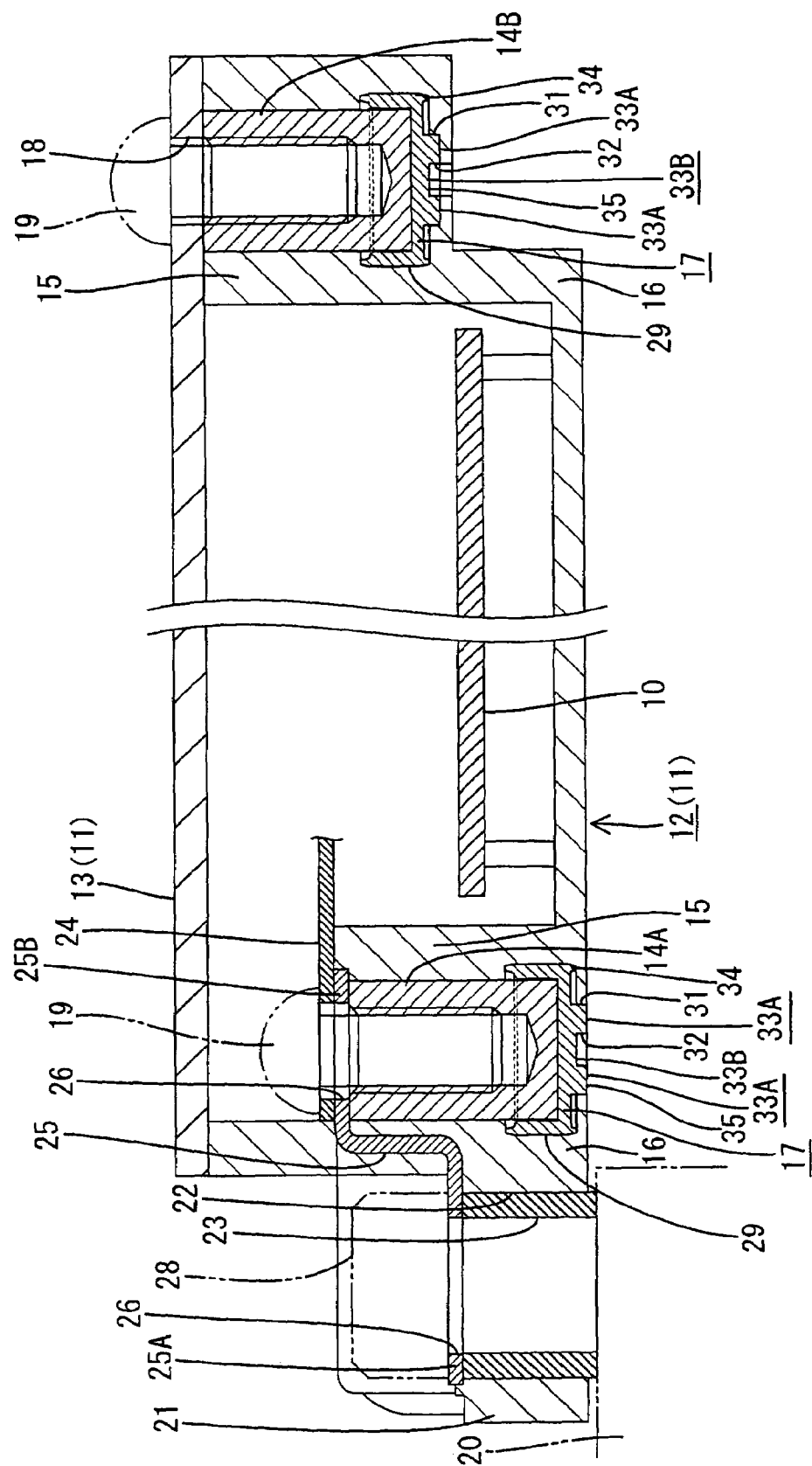
FIG. 1 is a partly enlarged sectional view showing an electronic control unit according to an embodiment of the present invention.

An embedding portion 15 is formed on a right side wall of the case 12 shown in FIG. 1 and is thicker than other portions of the case 12. A cover-fixing nut 14B is insert molded in the embedding portion 15 and can receive a screw for fixing the cover 13 to the case 12. The cover-fixing nut 14B is a long and narrow metal cap nut with an axial line thereof aligned vertically so that the cover-fixing nut 14B opens up. Thus, the cover-fixing nut 14B is embedded in a resin molded member 16 so that the cover-fixing nut 14B is surrounded by a unitary matrix of resin. An upper end of the cover-fixing nut 14B is approximately flush with an upper surface of the embedding portion 15. A cap 17 is fit on a lower end of the cover-fixing nut 14B from below, as described below. An insertion hole 18 is formed at a position on the cover 13 corresponding to the cover-fixing nut 14B. Thus, a screw 19 can be inserted through the insertion hole 18 into the cover-fixing nut 14B when the cover 13 is on the open top of the case 12 to fix the cover 13 to the case 12.

A mounting portion 21 projects left from a left outer side surface of the case 12 as shown in FIG. 1 and is used to mount the case 12 on a vehicle body 20. A circular through-hole 22 is formed on the mounting portion 21. An annular collar 23 made of metal is insert-molded in the through-hole 22. A lower end of the collar 23 projects slightly from a lower surface of the mounting portion 21.

A ground wire (not shown) is pulled out of an electronic control circuit accommodated in the case 12 and an earth terminal 24 is connected with an end of the ground wire. The earth terminal 24 can be connected to a relay busbar 25 insert-molded in the case 12. The relay busbar 25 is formed by press working of a metal plate into a predetermined configuration. A first end 25B of the relay busbar 25 is layered on an upper surface of a ground wire connection nut 14A, as described below. A central hole 26 is formed on the ground wire connection nut 14A at a position corresponding to an open portion thereof. A second end 25A of the relay busbar 25 is layered on an upper surface of the collar 23. The central hole 26 of the ground wire connection nut 14A is formed at a position corresponding to the through-hole 22 of the collar 23.

An embedding portion 15 is formed on a left side wall of the case 12 shown in FIG. 1 and is thicker than other portions of the case 12. The ground wire connection nut 14A is embedded in the embedding portion 15 and enables connection of the ground wire to the relay busbar 25. The ground wire connection nut 14A is insert-molded in the embedding portion 15 so that a unitary matrix of resin surrounds outer parts of the ground wire connection nut 14A. Additionally, the ground wire connection nut 14A opens up and has a vertically aligned axis. The ground wire connection nut 14A is structurally the same as the cover-fixing nut 14B, but the nuts 14A and 14B are used for different purposes. The relay busbar 25 is insert-molded in the case 12 so that a first end 25B of the relay bus bar 25 is layered on a peripheral edge of the opening of the ground wire connection nut 14A and so that an upper surface of the first end 25B of the relay busbar 25 is approximately flush with the upper surface of the embedding portion 15. Thus, a vertical or axial position of the ground wire connection nut 14A is below the vertical position of the cover-fixing nut 14B by the thickness of the relay busbar 25. As described above, two specifications are set for the vertical positions of the cover-fixing nut 14B and the ground wire connection nut 14A embedded in the embedding portion 15 of the case 12.

The earth terminal 24 is layered on an upper surface of the first end 25B of the relay busbar 25. The screw 19 then is inserted into the central hole 26 and threaded into the ground wire connection nut 14A. As a result, the earth terminal 24 and the busbar 25 are sandwiched between a head of the screw 19 and the peripheral edge of the opening of the ground wire connection nut 14A to connect the earth terminal to the relay busbar 25. The second end 25A of the relay busbar 25 is layered on the upper surface of the collar 23 when the relay busbar 25 is insert molded in the case 12 to electrically connect the second end 25A of the relay busbar 25 with the collar 23. A bolt 28 then can be inserted through the collar 23 and threaded into the vehicle body 20. Thus, a portion of the collar 23 that projects down from the mounting portion 21 is pressed against the surface of the vehicle body 20. Consequently, the collar 23 and the body 20 are connected electrically with each other. Further, the ground wire is connected electrically with the vehicle body 20 via the earth terminal 24, the relay busbar 25, the collar 23, and the bolt 28 to ground the electronic control circuit.

Synthetic resin caps 17 are telescoped axially over the closed ends of each of the cover-fixing nut 14B and the ground wire connection nut 14A. The cap 17 has a cylindrical body 29 with a closed end and an open end that fits over the closed end of the respective nut 14A, 14B. A receiving portion 31 projects axially from the outer surface of the closed end of the body 29 and engages a positioning portion 30 of a die 36 (see FIG. 6). The receiving portion 31 is approximately columnar and extends concentrically from a central position on closed end of the body 29. A concavity 32 extends concentrically into the projecting end of the receiving portion 31. The projecting end of the receiving portion 31 defines a first receiving surface 33A and the inner end of the concavity 32 defines a second receiving surface 33B.

A circular fusing portion 34 projects from a peripheral edge of the closed end of the body 29 and concentrically surrounds the receiving portion 31. The surface of the fusing portion 34 melts during insert molding and is integrated with the resin molded member 16. Identical caps 17 are fit on the cover-fixing nut 14B and on the ground wire connection nut 14A.

The first receiving surface 33A of the cap 17 fit on the cover-fixing nut 14B is exposed to the exterior of the resin molded member 16 and defines an exposed region 35. The first receiving surface 33A is approximately flush with the outer surface of the resin molded member 16, as shown in FIG. 1.

The cap 17 fit on the ground wire connection nut 14A is embedded inside the resin molded member 16, and hence is partly surrounded by a unitary matrix of resin. The second receiving surface 33B of the cap 17 fit on the ground wire connection nut 14A is exposed on the resin molded member 16 and defines an exposed region 35.

Figure 2:
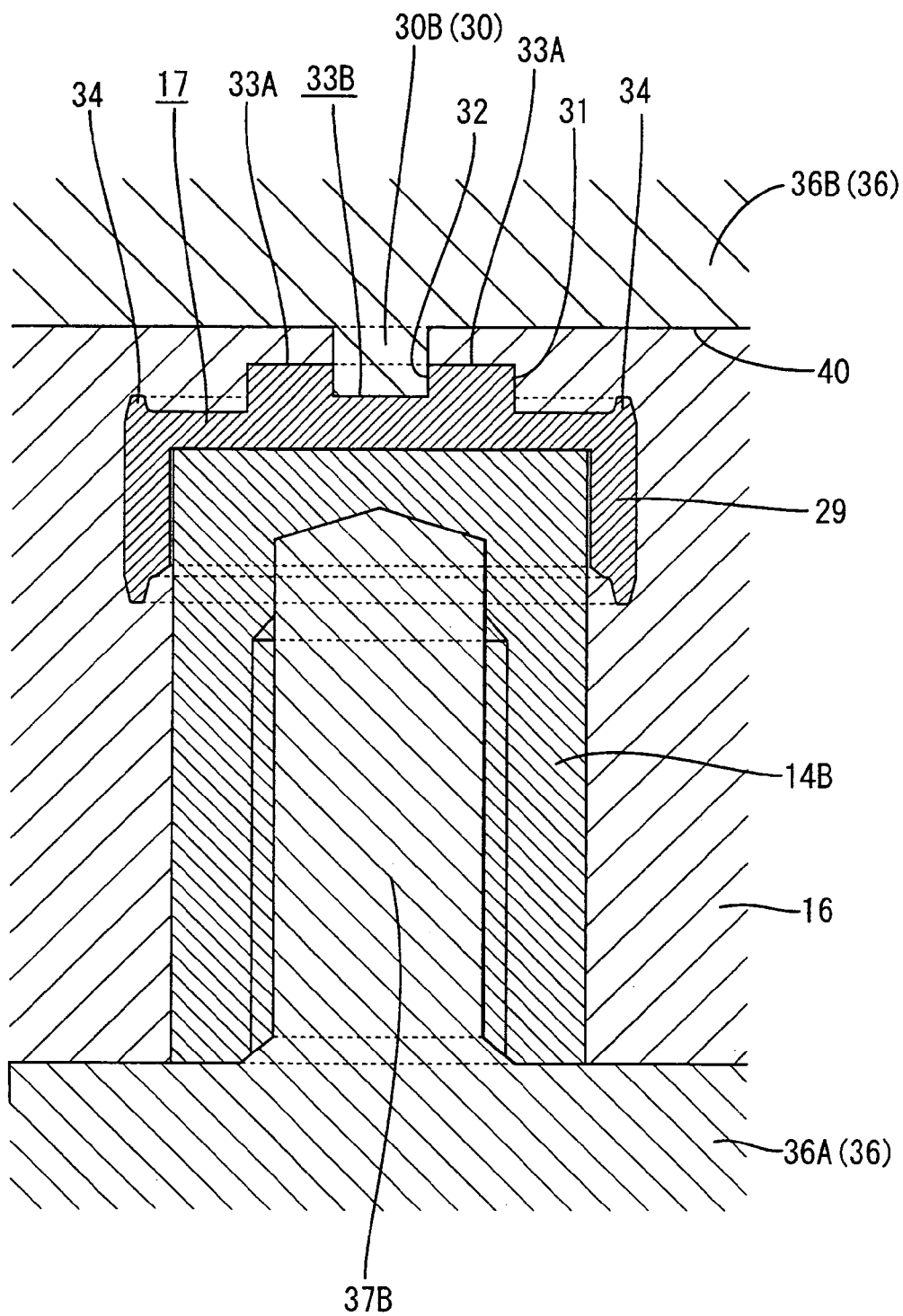
FIG. 2 is a partly enlarged sectional view showing a state in which a cover-fixing nut and a cap are insert-molded.
Figure 3:
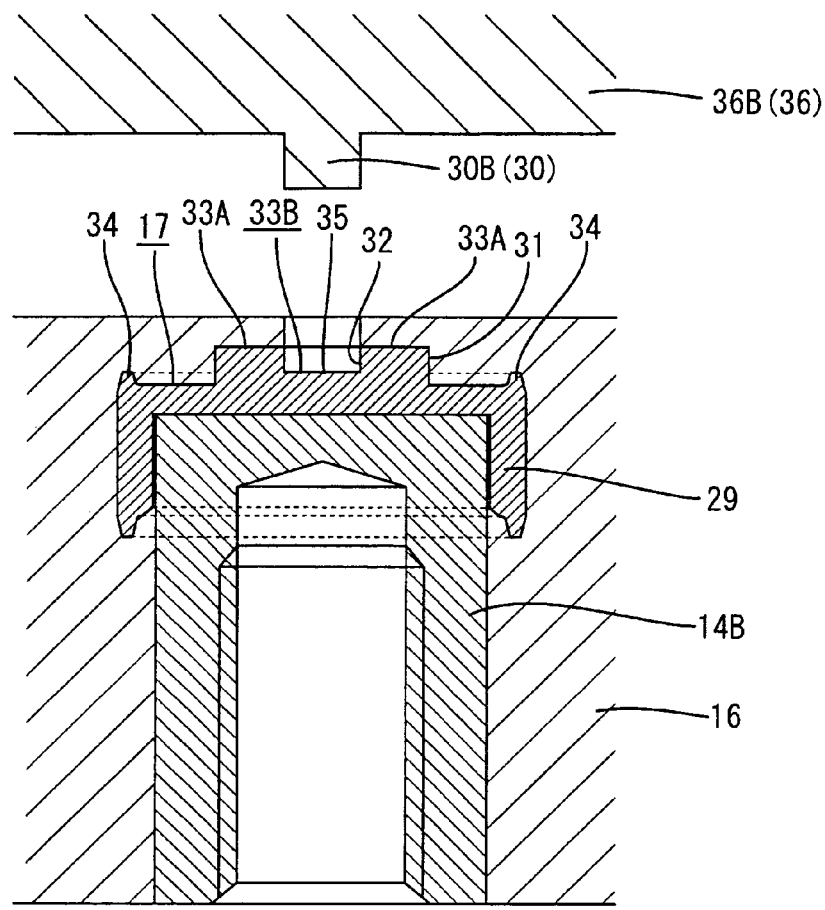
FIG. 3 is a partly enlarged sectional view showing a state in which the cover-fixing nut and the cap are insert-molded in a state in which a die is opened.
Figure 3:
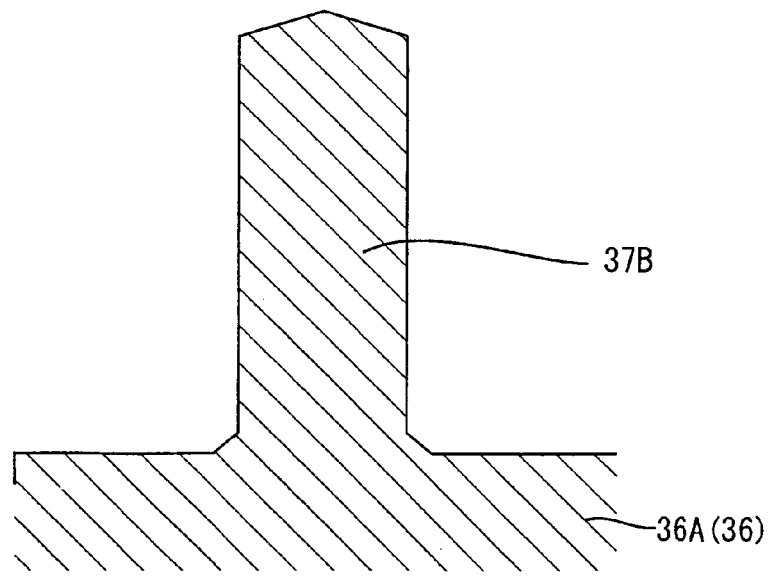
Figure 4:
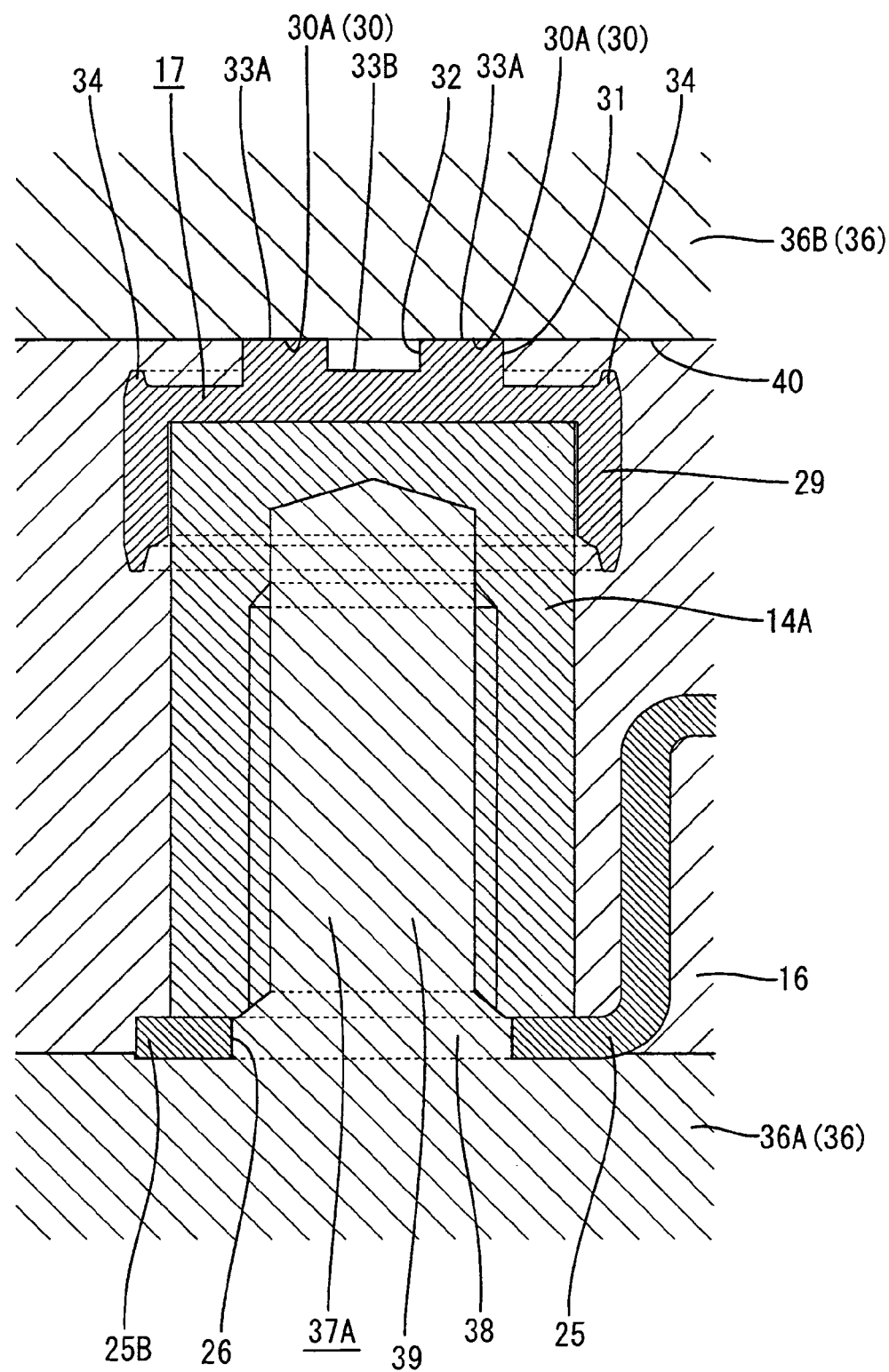
FIG. 4 is a partly enlarged sectional view showing a state in which a relay bus bar, a ground wire connection nut, and the cap are insert-molded.

The die 36 for molding the case 12 has a lower part 36A and an upper part 36B that is vertically movable. The terms upper and lower are used herein to provide a convenient frame of reference, and are not intended to imply a required gravitational orientation. As shown in FIG. 2, a supporting column 37B projects up from the lower part 36A and receives the cover-fixing nut 14B. An outer diameter of the supporting column 37B is approximately equal to an inner diameter of the cover-fixing nut 14B. As shown in FIG. 4, a supporting column 37A projects up from the lower part 36A and receives the ground wire connection nut 14A. A large-diameter portion 38 is disposed at a proximal side of the supporting column 37A and is inserted through the central hole 26 at the second end 25A of the relay busbar 25. The ground wire connection nut 14A is fit on a small-diameter portion 39 of the supporting column 37A to support the ground wire connection nut 14A in an inverted orientation. An outer diameter of the small-diameter portion 39 is approximately equal to an inner diameter of the ground wire connection nut 14A.

Figure 5:
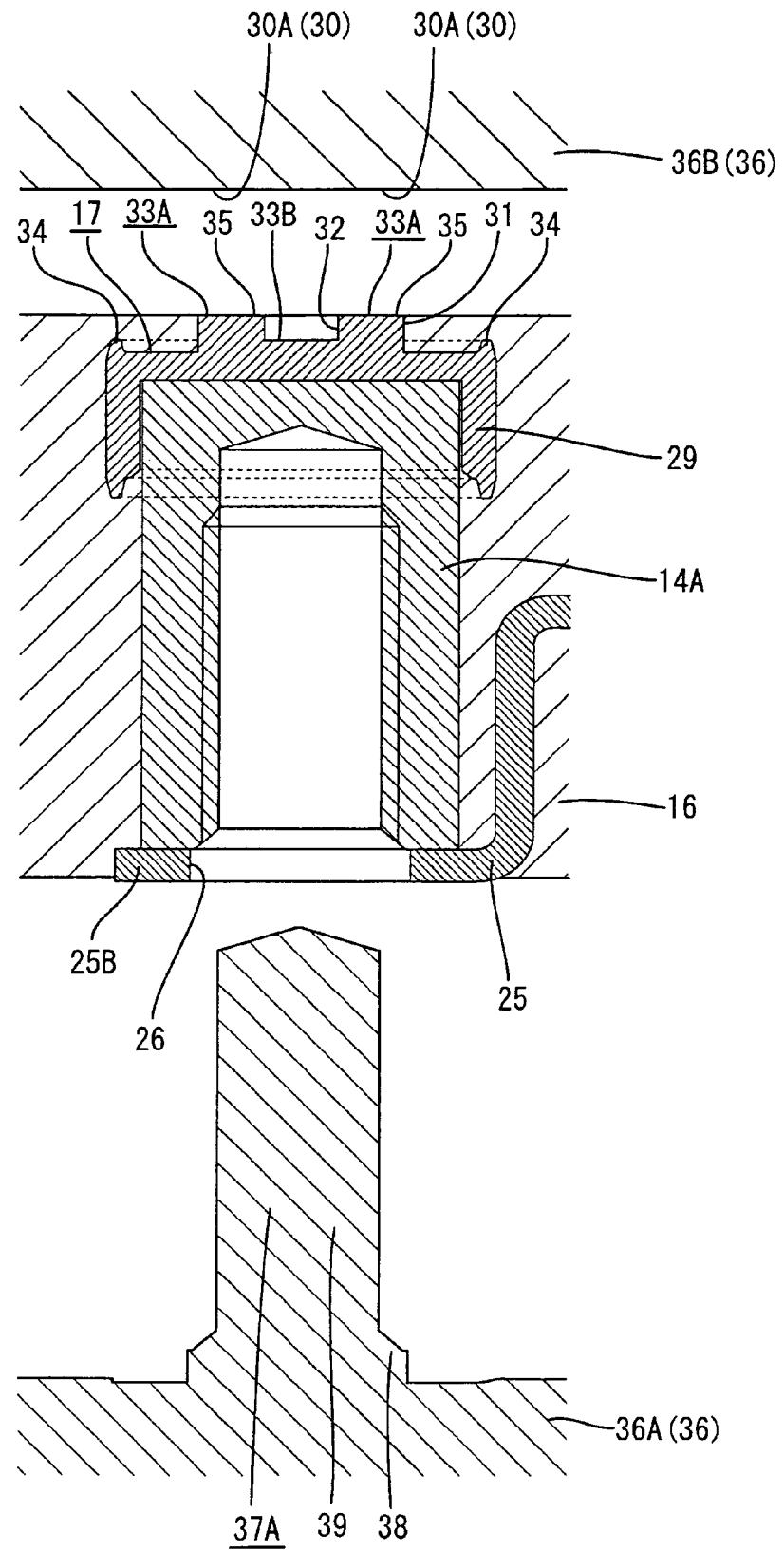
FIG. 5 is a partly enlarged sectional view showing a state in which the relay bus bar, the ground wire connection nut, and the cap are insert-molded in the state in which the die is opened.
Figure 6:
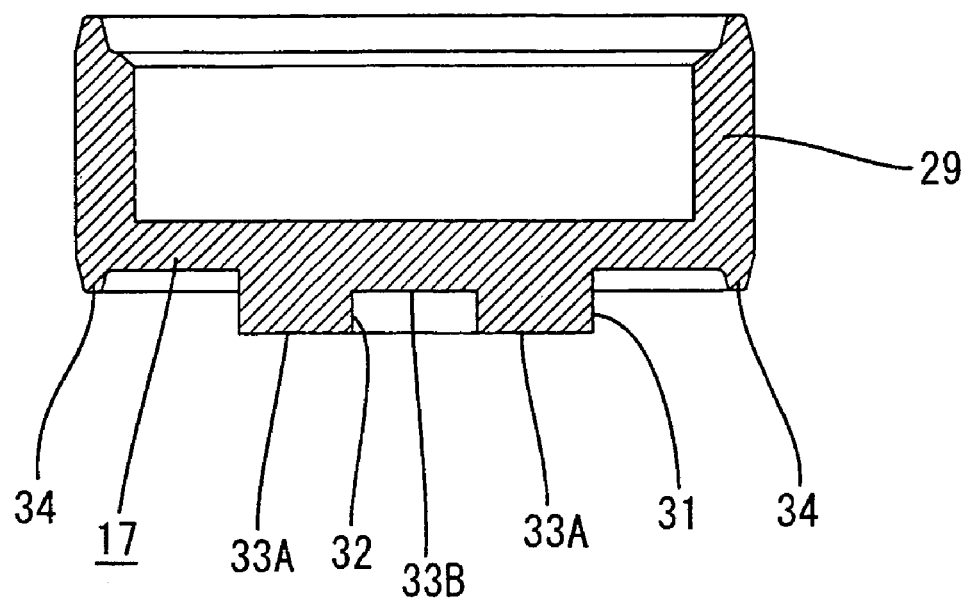
FIG. 6 is a sectional view showing the cap.

Positioning portions 30 are formed on the upper part 36B of the die 36 at positions corresponding to the first and second receiving surfaces 33A and 33B of the cap 17. Thus, the positioning portions 30 contact the first and second receiving surfaces 33A and 33B for holding the cap 17 in position. The positioning portions 30 are formed according to the specified depth of each of the nuts 14A, 14B. More particularly, as shown in FIG. 4, a first positioning portion 30A is at a position on the upper part 36B of the die 36 corresponding to the first receiving surface 33A for the cap 17 to be fit on the ground wire connection nut 14A and contacts the first receiving surface 33A. As shown in FIG. 5, the first receiving surface 33A is approximately flush with the upper surface of the resin molded member 16. Hence, the first positioning portion 30A is approximately flush with an inner surface of the upper part 36B of the die 36. As shown in FIG. 2, the second positioning portion 30B is approximately columnar and projects down from the upper part 36B of the die 36 at a position corresponding to the second receiving surface 33B of the cap 17 to be fit on the cover-fixing nut 14B. The length of the second positioning portion 30B in the axial direction of the ground wire connection nut 14A corresponds to the depth of the second receiving surface 33B from the upper surface of the resin molded member 16, as shown in FIG. 2.

The insert molding is carried out by inverting the cover-fixing nut 14B and fitting the open end of the cover-fixing nut 14B on the supporting column 37B of the die 36 from above, as shown in FIG. 2. The cap 17 then is inverted and the open end of the cap 17 is fit on the closed end of the cover-fixing nut 14B from above and along the axial direction of the cover-fixing nut 14B. As shown in FIG. 4, the first end 25B of the relay busbar 25 is fit on the large-diameter portion 38 of the supporting column 37A from above by inserting the supporting column 37A into the central hole 26 formed on the first end 25B. The ground wire connection nut 14A then is inverted and the open end is fit on the small-diameter portion 39 from above. The cap 17 then is inverted and the open end of the cap is fit on the closed end of the ground wire connection nut 14A in FIG. 4 from above and along the axial direction of the ground wire connection nut 14A. The depths of the cover-fixing nut 14B and the ground wire connection nut 14A are different from each other in the axial direction by the thickness of the relay bus bar 25. Although not shown in detail, the second end 25A of the relay busbar 25 is mounted at a predetermined position of the lower part 36A of the die 36, and the collar 23 is mounted on the upper surface of the second end 25A of the relay busbar 25. The above-described operations mount the cover-fixing nut 14B, the ground wire connection nut 14A, the cap 17, the relay bus bar 25, and the collar 23 at predetermined positions on the lower part 36A of the die 36.

The upper part 36B then is moved down to close the die 36. As a result, the second positioning portion 30B that projects from the upper part 36B contacts the second receiving surface 33B of the cap 17 from above and is pressed against the second receiving surface 33B, as shown in FIG. 2. Thus, the cap 17 and the cover-fixing nut 14B on which the cap 17 has been fit are held at predetermined positions inside the die 36. As shown in FIG. 4, the first positioning portion 30A on the upper part 36B contacts the receiving portion 31 of the cap 17 from above and is pressed against the receiving portion 31. Thus, the cap 17 and the ground wire connection nut 14A on which the cap 17 has been fit are held at predetermined positions inside the die 36. In this manner, the cover-fixing nut 14B and the ground wire connection nut 14A are held in position inside the die 36, with the specified depths of both nuts 14A, 14B in their axial directions differentiated from each other.

In this state, melted synthetic resin is injected into a cavity 40 formed between the lower and upper parts 36A and 36B. As a result, the surface of the fusing portion 34 of the cap 17 melts and is integrated with the synthetic resin charged into the cavity 40. The synthetic resin then is cooled to solidify, and the die is opened. As a result, the cover-fixing nut 14B, the ground wire connection nut 14A, the cap 17, the relay busbar 25 and the collar 23 are supported by a unitary matrix of the resin molded member 16 to form the case 12 shown in FIGS. 3 and 5. The first receiving surface 33A contacts the first positioning portion 30A during the insert molding, and is exposed on the outer surface of the resin molded member 16 to form an exposed region 35 at the end of the insert molding process. Similarly, the second receiving surface 33B contacts the second positioning portion 30B during the insert molding to form an exposed region 35 at the end of the insert molding process.

As described above, the first and second receiving surfaces 33A and 33B are formed on the caps 17 at positions shifted in the axial direction of the nuts 14A, 14B according to the specified depths of the nuts 14A and 14B in their axial directions. The die 36 has the first and second positioning portions 30A and 30B at the positions corresponding respectively to the first and second receiving surfaces 33A and 33B. The axial lengths of the first and second positioning portions 30A and 30B are set according to the specified depths of both nuts 14A, 14B in their axial directions. Thus, caps 17 of the same kind are fit on the cover-fixing nut 14B and the ground wire connection nut 14A, and the receiving surfaces 33A, 33B of each cap 17 contact the respective positioning portions 30 of the die 36. Therefore, the cover-fixing nut 14B and the ground wire connection nut 14A are held in position in the die 36 according to their specified depths. Manufacturing costs are reduced because the same kind of the caps 17 are used commonly for the cover-fixing nut 14B and the ground wire connection nut 14A that have different specified depths.

The fusing portion 34 that projects from the cap 17 has a lower specific heat than either the body 29 or the receiving portion 31 of the cap 17, and hence melts easily. Thus, the surface of the fusing portion 34 melts during the insert molding and becomes integral with the resin molded member 16. The fusing portion 34 surrounds the entire exposed region 35 of the cap 17 in a circumferential direction. Liquid might penetrate the boundary between the exposed region 35 and the resin molded member 16, but is prevented from penetrating further inward by the integral resin matrix defined by the fusing portion 34 and the resin molded member 16.

The ground wire and the relay busbar 25 are sandwiched between the head of the screw 19 and the peripheral edge of the opening of the ground wire connection nut 14A. Thus, the ground wire and the relay busbar 25 are connected reliably with each other and the connection reliability of the ground path is improved.

In forming the ground path, the general-purpose ground wire connection nut 14A and cover-fixing nut 14B can be used, and the relay busbar 25 composed of the metal plate used as the body material thereof is prepared as a new part. In addition, the ground wire connection nut 14A and cover-fixing nut 14B and the collar 23 are connected to the relay bus bar 25 in an embedding process in the insert molding work. Therefore it is unnecessary to prepare a special connection portion and a special connection process and possible to manufacture the insert-molded product at a low cost.

The invention is not limited to the embodiment described above, and the following embodiments are included in the technical scope of the invention. Further, various modifications of the embodiments can be made without departing from the spirit and scope of the invention.

The above-described cap 17 has the fusing portion 34. However, the fusing portion 34 can be omitted if the boundary between the resin molded member 16 and the cap 17 is sealed, for example, if the exposed portion of the cap 17 on the outer surface of the resin molded member 16 is covered with a lid.

The above-described embodiment has the construction in which different specified depths of the ground wire connection nut 14A and the cover-fixing nut 14B by layering the busbar on the peripheral edge of the opening of the ground wire connection nut 14A. However, the invention is applicable to an insert-molded product in which the thickness of the resin molded member 16 below the bottom of one nut is different from that of the resin molded member 16 below the bottom of the other nut.

The above-described case 12 has plural depth positions of the nuts 14A, 14B in the case 12. However, the invention is applicable where there is only one specified depth for the nuts in the same case, but plural depth positions of the nuts in different cases.

In the above-described embodiment, the invention is applied to the electronic control unit, but the invention is applicable to other insert-molded products.

In the above-described embodiment, two receiving surfaces are formed on the receiving portion 31 of the cap 17 at positions thereof shifted in the axial direction of the ground wire connection nut 14A. However, three or more receiving surfaces may be formed.

What is claimed is:

1. An insert-molded product having plural metal inserts (14A, 14B) embedded at least at first and second specified depths in a resin molded member (16), substantially identical synthetic resin caps (17) fit respectively on each of said inserts (14A, 14B), each of said caps (17) having at least first and second receiving surfaces (14A, 33B) offset from one another by a distance corresponding to a difference between the first and second specified depths.

2. The insert-molded product of claim 1, wherein at least one of the receiving surfaces (33A, 33B) of each of said caps (17) is exposed externally on the resin molded member (16).

3. The insert-molded product of claim 2, wherein a fusing portion (34) projects out on each of said caps (17), the fusing portions (34) being dimensioned to be melted during insert molding to join integrally with the resin molded member (16).

4. The insert-molded product of claim 3, wherein the fusing portion (34) surrounds the receiving surfaces (33A, 33B) of each of said caps (17).

5. The insert-molded product of claim 1, wherein the first receiving surfaces (33A) surrounds the second receiving surface (33B).

6. The insert-molded product of claim 1, wherein each of said caps (17) has a tubular side wall and an end wall extending across one end of the tubular side wall, the receiving surfaces (33A, 33B) projecting from the end wall.

7. The insert-molded product of claim 1, wherein the metal inserts (14A, 14B, 35) comprise nuts (14A, 14B) having an open end and a closed end, the caps (17) being mounted respectively over the closed ends of the nuts (14A, 14B).

8. The insert-molded product of claim 7, wherein the open end of each of said nuts (14A, 14B) is exposed externally on the resin molded member (16).

9. The insert-molded product of claim 8, wherein the resin molded member (16) comprises a case (12) of an electronic control unit.

10. The insert-molded product of claim 9, further comprising at least one busbar (25) insert molded in the case (12) and contacting at least one of the nuts (14A).

11. The insert-molded product of claim 10, wherein the busbar (35) has a thickness substantially equal to a difference between the specified depths.

12. An insert-molded case (12) for an electronic control unit, comprising:
  a plurality of nuts (14A, 14B) having opposite first and second ends and an external surface extending between the ends, the first end of each of said nuts (14A, 14B) being closed and an internally threaded cavity extending into the second end;
  resin caps (17) having opposite first and second ends, the first end of each of the caps (17) being closed and a hollow interior extending into the second end of the cap (17), the hollow interior of the caps (17) being fit respectively over the closed first ends of the nuts (14A) and portions of the external surface thereof;
  a metal collar (23) spaced from the nuts (14A, 14B), the collar (23) having opposite first and second ends and an opening extending therethrough;
  a busbar (25) having a first portion mounted on the first end of the collar (23) and second portion mounted on the second end of a first of the nuts (14A), a first hole (26) extending through the first portion of the busbar (25) and aligned with the opening of the collar (23) and a second hole (26) extending through the second end of the busbar (25) and aligned with the cavity of the first nut (14A); and a unitary matrix of resin (16) surrounding parts of the nuts (14A, 14B), the cap (17), the collar (23) and the busbar (25) so that at least the holes (26) of the busbar (25) and the closed ends of the caps (17) are exposed from the resin (16).

13. The insert molded case (12) of claim 12, wherein the first end of the cap (17) has at least first and second receiving surfaces (33A, 33B) offset axially from one another by a distance corresponding to a thickness of the busbar.

14. The insert molded case (12) of claim 13, wherein a fusing portion (34) projects out on each of said caps (17), the fusing portions (34) being joined integrally with the resin molded member (16).

15. The insert molded case (12) of claim 13, wherein the second end of the collar (23) is exposed from the resin (16).

16. The insert molded case (12) of claim 13, further comprising a cover (13) mounted to a second of the nuts (14B).

\* \* \* \* \*